United States Patent
Inuzuka et al.

(10) Patent No.: US 10,082,161 B2
(45) Date of Patent: Sep. 25, 2018

(54) GAS PRESSURE ACTUATOR

(71) Applicant: Takata Corporation, Tokyo (JP)

(72) Inventors: Koji Inuzuka, Shiga (JP); Kazuhiro Abe, Shiga (JP)

(73) Assignee: Takata Corporation, Tokyo (JP)

( * ) Notice: Subject to any disclaimer, the term of this patent is extended or adjusted under 35 U.S.C. 154(b) by 0 days.

(21) Appl. No.: 15/551,406

(22) PCT Filed: Feb. 19, 2016

(86) PCT No.: PCT/JP2016/054873
§ 371 (c)(1),
(2) Date: Aug. 16, 2017

(87) PCT Pub. No.: WO2016/136621
PCT Pub. Date: Sep. 1, 2016

(65) Prior Publication Data

US 2018/0038393 A1    Feb. 8, 2018

(30) Foreign Application Priority Data

Feb. 27, 2015  (JP) .................. 2015-039354

(51) Int. Cl.
*F15B 15/14* (2006.01)
*B60R 21/38* (2011.01)
*F15B 15/19* (2006.01)

(52) U.S. Cl.
CPC .......... *F15B 15/1433* (2013.01); *B60R 21/38* (2013.01); *F15B 15/1428* (2013.01); *F15B 15/19* (2013.01)

(58) Field of Classification Search
CPC .. F15B 15/1433; F15B 15/1428; F15B 15/19; B60R 21/38; C06D 5/00
See application file for complete search history.

(56) References Cited

U.S. PATENT DOCUMENTS

| 7,621,364 B2* | 11/2009 | Haglund | ................ B60R 21/38 180/274 |
| 7,650,957 B2* | 1/2010 | Takakura | ................ B60R 21/38 180/274 |

(Continued)

FOREIGN PATENT DOCUMENTS

| EP | 2699455 | 3/2016 |
| JP | 2010-236637 | 10/2010 |

(Continued)

OTHER PUBLICATIONS

International Search Report for PCT/JP2016/054873 dated May 24, 2016.

*Primary Examiner* — Darlene P Condra
(74) *Attorney, Agent, or Firm* — IPUSA, PLLC

(57) ABSTRACT

A gas pressure actuator includes a launcher, a gas generator that is disposed at a first axial end of the launcher, a rocket part placed inside the launcher, an end pad and a sealing gasket respectively disposed at a second axial end of the launcher, and a gasket holder supporting the gasket. The rocket part includes a first portion disposed at a location corresponding to the first axial end and a second portion that has a diameter less than that of the first portion and that ranges from the first portion toward the second axial end. The end pad includes a position determination part that determines positioning of the rocket part and restricts the rocket part from being displaced in a direction away from the first axial end. The gasket holder may be pressed by the first portion when the rocket part protrudes from the launcher and plastically deformed.

7 Claims, 4 Drawing Sheets

(56) References Cited

U.S. PATENT DOCUMENTS

| | | | | |
|---|---|---|---|---|
| 7,946,376 B2* | 5/2011 | Hayashi | ................... | B60R 21/38 |
| | | | | 180/274 |
| 9,573,560 B1* | 2/2017 | Narita | ..................... | B60R 21/38 |
| 2007/0013197 A1* | 1/2007 | Bender | ................. | E05B 51/023 |
| | | | | 292/201 |
| 2015/0175496 A1 | 6/2015 | Inuzuka | | |
| 2017/0350423 A1* | 12/2017 | Kwon | ................... | F15B 15/063 |

FOREIGN PATENT DOCUMENTS

| | | |
|---|---|---|
| JP | 2014-31884 | 2/2014 |
| JP | 2014-511986 | 5/2014 |
| JP | 2015-124829 | 7/2015 |
| WO | 2014/010703 | 1/2014 |

\* cited by examiner

GAS PRESSURE ACTUATOR

BACKGROUND OF THE INVENTION

1. Field of the Invention

The present invention relates to a gas pressure actuator, and in particular, relates to a gas pressure actuator that is extended by causing a rocket part to protrude from an axial end of a launcher using high-pressure gas generated by a gas generator.

2. Description of the Related Art

Conventionally, an actuator that is used for, for example, an automobile safety device is known (e.g., refer to Patent Document 1). An actuator described in Patent Document 1 includes a gas generator, a launcher as a cylinder having a tubular shape, and a rocket part as a piston rod. The gas generator is disposed at an axial end of the launcher. The rocket part is placed inside the launcher before the actuator is activated. When the actuator is activated, the rocket part slides along an inner wall of the launcher and protrudes from the other axial end of the launcher.

In the above-described actuator, when high-pressure gas is generated by the gas generator, the high-pressure gas acts on a surface of an end of the rocket part facing the gas generator in the axial direction of the launcher, and the rocket part receives a force that presses the rocket part toward the other axial end of the launcher. In this case, the rocket part slides along an inner wall of the launcher and protrudes from the other axial end of the launcher, and thus, the actuator is extended in the axial direction.

CITATION LIST

Patent Document

[Patent Document 1] Japanese Unexamined Patent Application Publication No. 2010-236637

SUMMARY OF THE INVENTION

Technical Problem

The actuator includes an end pad disposed at the other axial end of the launcher. The end pad has a function for defining a position of the rocket part before the actuator is activated and for restricting displacement of the rocket part toward the other axial end. Further, the rocket part has a large diameter portion, including a sliding surface that slides along an inner wall of the launcher, at an axial end of the rocket part. An output of the gas generator is set by assuming an existence of a load such as an automobile safety device. Therefore, if high-pressure gas is generated by the gas generator when there is no load, then an excessive pressing force acts on the rocket part. When such an excessive pressing force acts on the rocket part, if the large diameter portion of the rocket part is directly brought into contact with the above-described end pad, then, a large impact load may be added to the end pad, and thus, the actuator may be damaged.

The present invention is made in view of the above. An object of the present invention is to provide a gas pressure actuator that is capable of reducing the impact added to the end pad by the rocket part when high-pressure gas is generated by the gas generator and when there is no load.

Solution to Problem

According to an aspect of the present invention, a gas pressure actuator includes a launcher that has a tubular shape; a gas generator that is disposed at a first axial end of the launcher and generates high-pressure gas when the gas pressure actuator is activated; a rocket part that has a first portion disposed at a location corresponding to the first axial end of the launcher and a second portion which has a diameter less than that of the first portion and which ranges from the first portion toward a second axial end that is opposite to the first axial end of the launcher, the rocket part being placed inside the launcher; an end pad that is disposed at the second axial end of the launcher and includes a position determination part which determines positioning of the rocket part with respect to the launcher and which restricts the rocket part from being displaced in a direction away from the first axial end of the launcher; a gasket that is disposed at the second axial end of the launcher and seals a gap between the launcher and the rocket part; and a gasket holder that supports the gasket and is configured to be plastically deformed by being pressed by the first portion of the rocket part when the rocket part protrudes from the launcher in response to an activation of the gas pressure actuator.

Advantageous Effects of Invention

According to an embodiment of the present invention, it is possible to reduce an impact added to the end pad by the rocket part when high-pressure gas is generated by the gas generator and when there is no load.

DETAILED DESCRIPTION OF THE PREFERRED EMBODIMENTS

Figure 1:
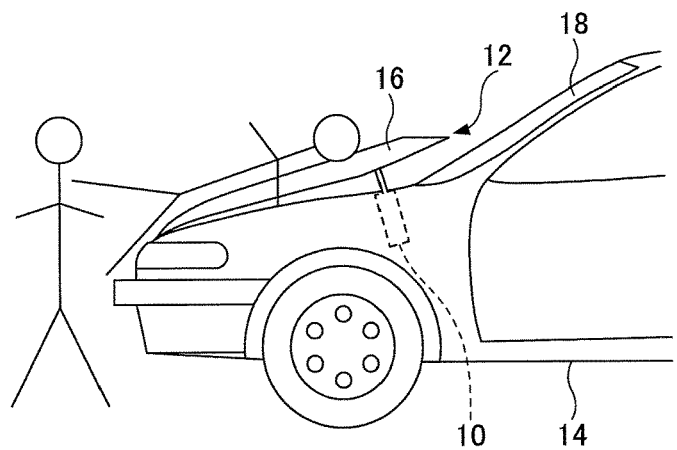
FIG. 1 is a side view of a vehicle including a vehicle safety device to which a gas pressure actuator according to an embodiment of the present invention is applied.

In the followings, referring to the drawings, a gas pressure actuator according to an embodiment of the present invention will be described.

FIG. 1 is a side view of a vehicle 14 including a vehicle safety device 12 to which a gas pressure actuator 10 according to an embodiment of the present invention is applied.

The vehicle safety device 12 is a safety device for reducing an impact on a pedestrian who has collided with or who is expected to collide with the vehicle 14. Specifically, the vehicle safety device 12 is a hood lifting device that lifts a windshield 18 side of a hood (bonnet) 16 of the vehicle 14 from under the hood 16 by activating the gas pressure actuator 10 when it is detected that a pedestrian has collided with or is expected to collide with the vehicle 14.

When the windshield 18 side of the hood 16 is lifted, a gap created under the hood 16 is enlarged, and thus, the cushioning property of the hood 16 is increased. Therefore, according to the vehicle safety device 12, it is possible to reduce an impact that a pedestrian, who has collided with a front bumper of the vehicle 14, receives from the hood 16, and it is possible to reduce the pedestrian's risk of colliding with the windshield 18.

Figure 2:
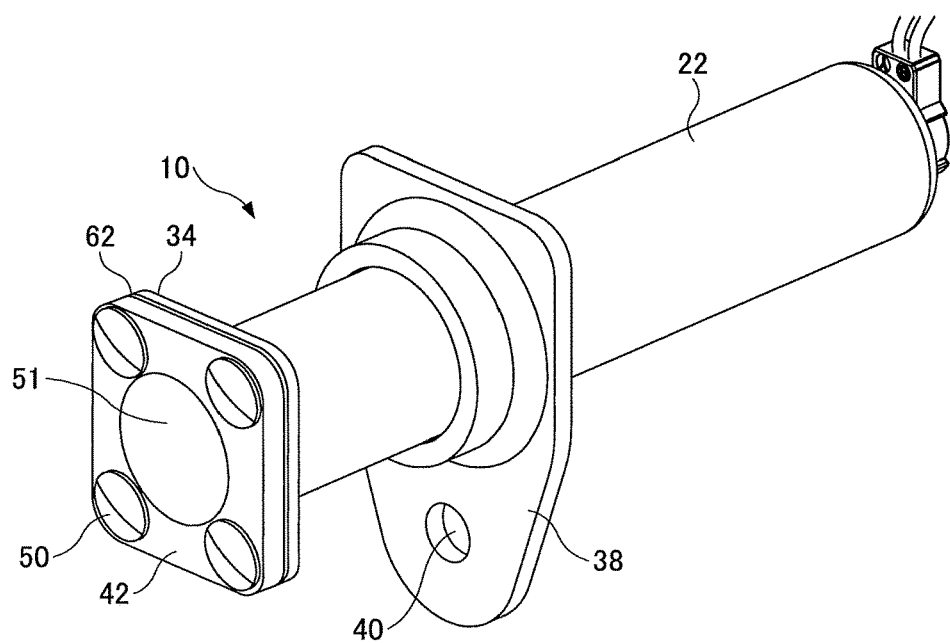
FIG. 2 is a perspective view after completion of assembling a gas pressure actuator according to an embodiment of the present invention.
Figure 3:
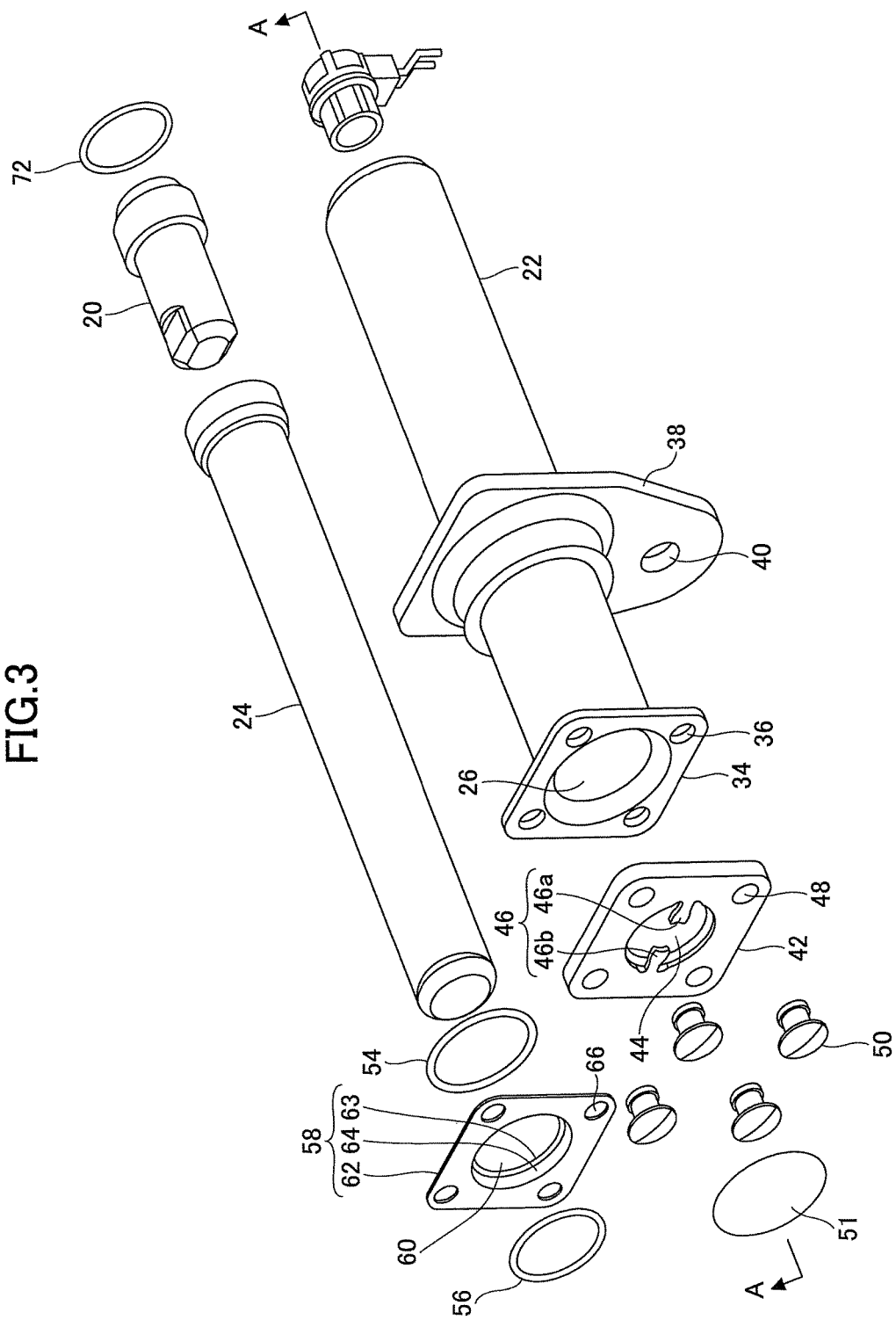
FIG. 3 is an exploded perspective view of a gas pressure actuator according to an embodiment of the present invention.
Figure 4:
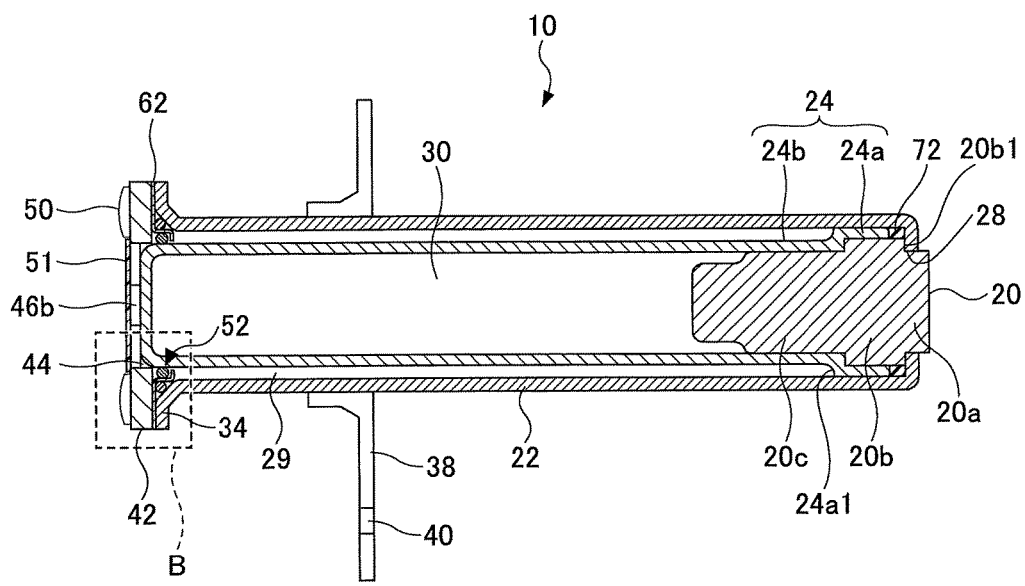
FIG. 4 is an overall sectional view along an A-A line in FIG. 3 of a gas pressure actuator according to an embodiment of the present invention.
Figure 5:
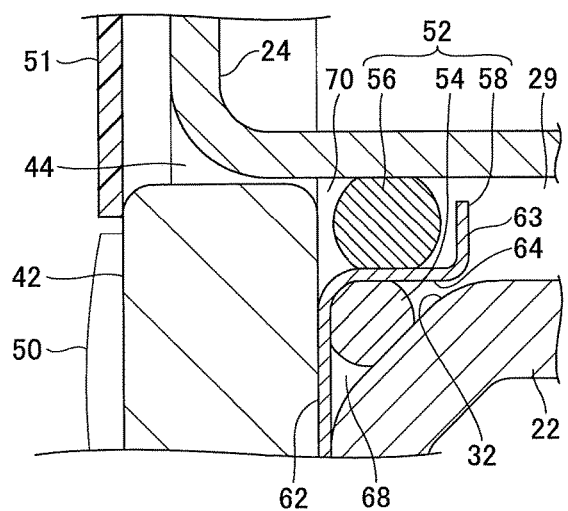
FIG. 5 is an enlarged partial sectional view of a gas pressure actuator according to an embodiment of the present invention, indicating a part surrounded by a dashed line in FIG. 4.
Figure 6:
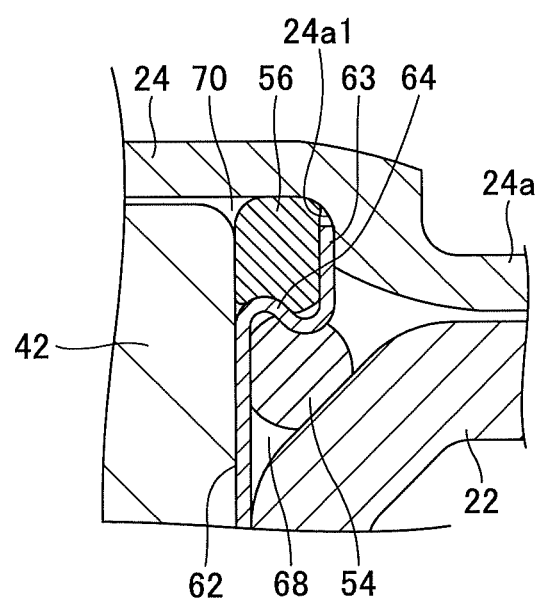
FIG. 6 is an enlarged partial sectional view illustrating a state of a launcher and a rocket part of a gas pressure actuator according to an embodiment of the present invention after the gas pressure actuator is activated.

FIG. 2 is a perspective view after completion of assembling a gas pressure actuator 10 according to an embodiment of the present invention. FIG. 3 is an exploded perspective view of a gas pressure actuator 10 according to an embodiment of the present invention. FIG. 4 is an overall sectional view along an A-A line in FIG. 3 of a gas pressure actuator 10 according to an embodiment of the present invention. FIG. 5 is an enlarged partial sectional view of a gas pressure actuator 10 according to an embodiment of the present invention, indicating a part B surrounded by a dashed line in FIG. 4. FIG. 6 is an enlarged partial sectional view illustrating a state of a launcher and a rocket part of a gas pressure actuator 10 according to an embodiment of the present invention after the gas pressure actuator 10 is activated.

In an embodiment of the present invention, the gas pressure actuator 10 includes a gas generator 20. The gas generator 20 generates high-pressure gas. The gas generator 20 is connected to a controller via a signal line, and operates according to operational instructions from the controller to generate high-pressure gas. The gas pressure actuator 10 is activated and extended according to generation of high-pressure gas by the gas generator 20.

The gas pressure actuator 10 includes a launcher 22 and a rocket part 24. The launcher 22 is formed in a tubular shape, and extends along an axial direction. The launcher 22 is formed to have a predetermined length (e.g., 110 mm) in the axial direction. The launcher 22 has a void tubular space 26 in which the rocket part 24 of the gas pressure actuator 10 is placed before the activation, and by which the surroundings of the rocket part 24 can be covered. The launcher 22 is a launch barrel used for displacing the rocket part 24 placed in the tubular space 26 in an axial direction of the launcher 22 (in a left direction in FIG. 4).

The above-described gas generator 20 is formed in a cylindrical shape, and is formed to have a predetermined length (e.g., 30 mm) in the axial direction. The gas generator 20 is placed in the tubular space 26 of the launcher 22. The surroundings of the gas generator 20 are covered by the launcher 22. The gas generator 20 is disposed on an axial line of the launcher 22 at a first axial end (at a right end in FIG. 4) of the launcher 22. The signal line, which connects the gas generator 20 with the controller, is connected to the gas generator 20 at an axial end of the launcher 22.

In an end surface of the first axial end of the launcher 22, a near-circular opening 28, whose opening faces the axial direction of the launcher 22, is formed. The opening 28 has a diameter that is less than an inner diameter of the body of the launcher 22 (or the tubular space 26). The gas generator 20 has a first small diameter portion 20a, a large diameter portion 20b, and a second small diameter portion 20c disposed at in this order from the first axial end (right end in FIG. 4) to the second axial end (left end in FIG. 4). The first small diameter portion 20a has an outer diameter that is almost equal to or slightly less than a diameter of the opening 28. The large diameter portion 20b has an outer diameter that is greater than the diameter of the opening 28. The second small diameter portion 20c has an outer diameter that is less than the diameter of the large diameter portion 20b.

In other words, the gas generator 20 is formed to have steps created by the first diameter portion 20a, the large diameter portion 20b, and the second small diameter portion 20c disposed at in this order from the first axial end. The first small portion 20a is fit into the opening 28, and an end surface 20b1, of the large diameter portion 20b, which faces the first axial end of the launcher 22, is in contact with (via a third gasket 72 that will be described later) an inner surface of a flange that is formed at the first axial end of the launcher 22, and thus, the gas generator 20 is supported by the first axial end of the launcher 22.

The rocket part 24 is formed in a tubular shape, and extends along an axial direction. The rocket part 24 is coaxial with the launcher 22. The rocket part 24 is formed to have a U-shaped cross section that is open at the first axial end (right end in FIG. 4) and is closed at the second axial end (left end in FIG. 4). The rocket part 24 is placed in the tubular space 26 of the launcher 22 before the gas pressure actuator 10 is activated. The rocket part 24 is formed to have a predetermined length (e.g., 110 mm), which is substantially the same as the launcher 22, in the axial direction.

The rocket part 24 has an outer diameter that is slightly less than an inner diameter of the body of the launcher 22 (or the tubular space 26) throughout the entire axial length. Between an outer wall surface of the rocket part 24 and an inner wall surface of the launcher 22, a predetermined gap (e.g., length 0.1 mm to 3 mm in a radial direction) 29 is formed. The rocket part 24 has a large diameter portion 24a (first portion) and a small diameter portion 24b (second portion) disposed at in this order from the first axial end to the second axial end.

An inner diameter of the large diameter portion 24a is almost equal to or slightly greater than an outer diameter of the large diameter portion 20b of the gas generator 20. An outer diameter of the large diameter portion 24a is almost equal to or slightly less than the inner diameter of the body of the launcher 22. An inner diameter of the small diameter portion 24b is less than the inner diameter of the large diameter portion 24a, and is almost equal to or slightly greater than an outer diameter of the second small diameter portion 20c of the gas generator 20.

It should be noted that the inner diameter of the small diameter portion 24b of the rocket part 24 may be set in such a way that a portion at the second axial end of the gas generator 20 can be placed (accommodated) in the small diameter portion 24b. Further, it is preferable that an outer diameter of the small diameter portion 24b of the rocket part 24 is set to a minimum diameter that enables the rocket part 24 to secure a required safety level as a pressure vessel corresponding to a maximum inner pressure of a space 30, which will be described later, by taking into account a total load, temperature, etc.

The small diameter portion 24b of the rocket part 24 ranges from a position adjacent to the large diameter portion 24a to a position of an end surface at the second axial end.

In other words, the rocket part 24 is formed in such a way that a step is created by the large diameter portion 24a and the small diameter portion 24b disposed at in this order from the first axial end, that is, in such a way that a portion of the opening side has a diameter slightly greater than the other portion.

Before the gas pressure actuator 10 is activated, the rocket part 24 is arranged in such a way that a portion of the gas generator 20 is placed (accommodated) in a portion of the first axial end of the rocket part 24. In other words, the rocket part 24 is arranged in such a way that the second small diameter portion 20c of the gas generator 20 is fit into the small diameter portion 24b, the large diameter portion 20b of the gas generator 20 is fit into the large diameter portion 24a, and the entire circumference of the step between the small diameter portion 24b and the large diameter portion 24a is in contact with the step between the second diameter portion 20c and the large diameter portion 20b of the gas generator 20. In the above-described arrangement state, a blocked space 30 is formed inside the rocket part 24. When high-pressure gas is generated by the gas generator 20, the high-pressure gas flows into the space 30 in the rocket part 24. When the high-pressure gas flows into the space 30 in the rocket part 24, the rocket part 24 is displaced in a direction away from the first end of the launcher 22, and thus, the rocket part 24 protrudes from the second axial end of the launcher 22.

In a second axial end surface of the launcher 22, a near-circular opening 32 facing the axial direction is formed. The opening 32 is coaxial with the launcher 22 and the rocket part 24, and is formed in such a way that the rocket part 24 can pass through the opening 32 when the gas pressure actuator 10 is activated. The opening 32 has a diameter equal to or greater than an outer diameter of the rocket part 24.

In a second axial end surface of the launcher 22, a flange 34 extending outward in a radial direction is formed. The flange 34 is formed in a rectangular shape surrounding the opening 32. The flange 34 has, for example, four through holes 36 that pass through the flange 34 in the axial direction. The through holes 36 are used for fixing an end pad 42, which will be described later, to the flange 34 with rivets inserted into the through holes 36.

In the middle of the launcher 22 in the axial direction, a bracket 38 extending outward in a radial direction is provided. The bracket 38 may be provided as an integral part of the launcher 22, or may be provided as a separate part, attached and fixed to an outer wall surface of the launcher 22 by welding. It should be noted that the position, at which the bracket 38 is provided in the launcher 22, may be an appropriate position for forming a desired vacant space under the hood 16 when the gas pressure actuator 10 fixed to the vehicle 14 is activated.

The bracket 38 has, for example, a through hole 40 that passes through the bracket 38 in the axial direction. The through hole 40 is used for fixing the launcher 22 to an object (e.g., the body of the vehicle 14) with a bolt inserted into the through hole 40. The flange 34 is a bracket used for fixing the launcher 22 to an object.

The end pad 42 is attached to the second axial end of the launcher 22. The end pad 42 is a plate formed separately from the launcher 22, and is formed in a flat plate shape. The end pad 42 is formed in a rectangular shape that is substantially the same as the flange 34 of the launcher 22. The end pad 42 is arranged in such a way that the end pad 42 is in contact with an end surface of the second axial end of the flange 34 of the launcher 22.

The end pad 42 has a near-circular opening 44 that passes through the end pad 42 in the axial direction. The opening 44 is coaxial with the launcher 22 and the rocket part 24, and is formed in such a way that the rocket part 24 can pass through the opening 44 when the gas pressure actuator 10 is activated. The opening 44 has a diameter that is less than an inner diameter (including a diameter of the opening 32) of the body of the launcher 22 (or the tubular space 26). The diameter of the opening 44 is equal to or greater than (preferably, slightly greater than) an outer diameter of the second axial end of the rocket part 24 (specifically, an outer diameter of the small diameter portion 24b), and is less than an outer diameter of the first axial end of the rocket part 24 (specifically, an outer diameter of the large diameter portion 24a).

The end pad 42 includes protrusions 46. The protrusions 46 protrude inward in a radial direction (toward the axial center) from the periphery surrounding the opening 44 and are used for positioning. A diameter of the opening 44 of the end pad 42 at a position where the protrusions 46 are included is less than an outer diameter of the body of the rocket part 24 (specifically, the small diameter portion 24b). The protrusions 46 are located at a position where the opening 44 is partially intercepted. The protrusions 46 of the end pad 42 have a function for positioning the rocket part 24 by causing the protrusions 46 to contact the end surface of the second axial end of the rocket part 24 placed in the tubular space 26 of the launcher 22 before the gas pressure actuator 10 is activated, and for restricting displacement of the rocket part 24 in a direction away from the first end of the launcher 22.

The protrusions 46 protrude inward in a radial direction from, for example, two locations facing each other in the end pad 42 surrounding the opening 44. Here, the protrusions 46 are referred to as protrusions 46a, 46b. As illustrated in FIG. 3, the protrusion 46a and the protrusion 46b are not connected to each other but separated near the axial center. A tip of the protrusion 46a and a tip of the protrusion 46b face each other with the axial center sandwiched between them. It should be noted that it is preferable that the protrusions 46 be disposed in the end pad 42 surrounding the opening 44 at point symmetric positions around the axis of the opening 44. The number of the protrusions is not limited to two, and may be three or more.

It should be noted that grooves that dent in the axial direction may be formed on the axial end of the rocket part 24. The grooves are formed at positions corresponding to the protrusions 46, and have sizes corresponding to the protrusions 46. In this case, the protrusions 46a, 46b illustrated in FIG. 3 are fit into the grooves of the rocket part 24 before the activation. When the protrusions 46a, 46b are fit into the grooves, a relative rotation of the launcher 22 and the rocket part 24 around the axis is prohibited, and thus, relative positioning of the launcher 22 and the rocket part 24 is appropriately performed before the activation of the gas pressure actuator 10.

When the gas pressure actuator 10 is activated, specifically, when the rocket part 24 is displaced in a direction away from the first end of the launcher 22 due to the high-pressure gas generated by the gas generator 20 and the rocket part 24 passes through the opening 32 of the launcher 22 and the opening 44 of the end pad 42, it is possible that the protrusions 46 are pressed by the end surface of the second axial end of the rocket part 24, and that the protrusions 46 are bent and deformed or fractured, almost without affecting the displacement of the rocket part 24.

The end pad 42 includes through holes 48 that pass through the end pad 42 in the axial direction. The number of the through holes 48 is the same as the number of the through holes 36 of the flange 34. The through holes 48 are used for fixing the end pad 43 to the flange 34 with rivets 50 inserted into the through holes 48. The rivets 50 are inserted into the through holes 48 of the end pad 42 and the through holes 36 of the flange 34 of the launcher 22, and thus, the end pad 42 with the protrusions 46 is fastened or fixed to the flange 34 of the launcher 22.

A sealing part 51 made of a resin material used for sealing the opening 44 is attached to the end pad 42 by using an adhesive, etc. The sealing part 51 is provided to prevent intrusion of foreign substances into the tubular space 26 of the launcher 22 from the opening 44 before the gas pressure actuator 10 is activated. When the gas pressure actuator 10 is activated, the rocket part 24 protrudes, and thus, the sealing part 51 is removed from the end pad 42.

In the case where the rocket part 24 is entirely placed in the tubular space 26 of the launcher 22 before the activation of the gas pressure actuator 10, an axial position of the second axial end of the launcher 22 is substantially the same as an axial position of the second axial end of the rocket part 24. An outer diameter of the small diameter portion 24b of the rocket part 24 is less than an inner diameter of the launcher 22. As a result, a gap 29 is formed between an inner wall surface of the launcher 22 and an outer wall surface of the rocket part 24. A second axial end of the gap 29 is blocked by the end pad 42.

At the second axial end of the gap 29, a gasket structure 52 is provided. The gasket structure 52 is provided to seal the gap 29 between a portion at the second axial end of the launcher 22 and a portion at the second axial end of the rocket part 24 before the activation of the gas pressure actuator 10. The gasket structure 52 is arranged in such a way that the gasket structure 52 is in contact with an inner wall surface of the second axial end of the launcher 22 (specifically, an inner wall near a rounded boundary between the tubular body and the flange 34) and in contact with an outer wall surface of the second axial end of the rocket part 24.

The gasket structure 52 includes a first gasket 54, a second gasket 56, and a gasket holder 58. The first and the second gaskets 54, 56 are elastic parts made of a resin, formed in a tubular shape or a ring shape. The first gasket 54 and the second gasket 56 are separated from each other. The first and second gaskets 54, 56 are O-rings that each have circular sections. The first gasket 54 has an outer diameter that is substantially the same as the inner diameter of the launcher 22. Further, the second gasket 56 has an inner diameter that is substantially the same as the outer diameter of the small diameter portion 24b of the rocket part 24. It should be noted that the first and second gaskets 54, 56 may be formed in such a way that a diameter of the first gasket 54 is slightly greater than a diameter of the second gasket 56.

The first and second gaskets 54, 56 are arranged at the second axial end of the launcher 22. The first gasket 54 is in contact with an inner wall surface of the second axial end of the launcher 22 (specifically, an inner wall surface near the boundary between the tubular body and the flange 34). As a result, the gap 29 is sealed by the first gasket 54 to prevent intrusion of water, etc., from the launcher 22 side. Further, the second gasket 56 is in contact with an outer wall surface of the second axial end of the rocket part 24. As a result, the gap 29 is sealed by the first gasket 56 to prevent intrusion of water, etc., from the rocket part 24 side.

The gasket holder 58 supports the first and second gaskets 54, 56, and are formed in a shape such that, when the rocket part 24 protrudes in response to the activation of the gas pressure actuator 10, the gasket holder 58 is pressed by the large diameter portion 24a in a direction away from the first end of the launcher 22, and is plastically deformed. The gasket holder 58 is made of a metal.

The gasket holder 58 has a near-circular opening 60 that passes through the gasket holder 58 in the axial direction. The opening 60 is coaxial with the launcher 22 and the rocket part 24, and is formed in such a way that the rocket part 24 can pass through the opening 32 when the gas pressure actuator 10 is activated. The opening 60 has a diameter equal to or greater than the outer diameter of the rocket part 24.

The gasket holder 58 includes a flange portion 62, a receiving portion 63, and tubular portion 64 that are formed integrally. The flange portion 62 is formed in a rectangular shape surrounding the opening 60. The flange portion 62 is a portion to be sandwiched by the flange 34 and the end pad 42 of the launcher 22. The flange portion 62 has through holes 66 that pass through the flange portion 62 in the axial direction. The number of the through holes 66 is the same as the number of the through holes 36 of the flange 34 and the number of the through holes 48 of the end pad 42. The rivets 50 are inserted into the through holes 66. The first axial side of the first gasket 54, the second gasket 56, and the gasket holder 58 (the flange portion 62, the receiving portion 63, and the tubular portion 64) indicates the flange 34 side, and the second axial side indicates the end pad 42 side.

The receiving portion 63 is formed in a ring shape surrounding the opening 60. The receiving portion 63 is a flange with a predetermined length in a radial direction, and with a surface facing the axial direction. The length in a radial direction of the receiving portion 63 is slightly less than a length in a radial direction of the gap 29 between the inner wall surface of the launcher 22 and the outer wall surface of the rocket part 24. The receiving portion 63 is brought into contact with an end surface 24a1, which faces the second axial direction of the rocket part 24, of the large diameter portion 24a of the rocket part 24 when the rocket part 24 protrudes, and thus, the receiving portion 63 may receive a pressing force from the rocket part 24 in a direction away from the first end of the launcher 22. On the second axial side of the receiving portion 63, a space 70 (a second gap) surrounded by the tubular portion 64, the end pad 42, and the rocket part 24 is formed.

The tubular portion 64 is formed in a shape such that the tubular portion 64 may be pressed by the large diameter portion 24a of the rocket part 24 in a direction away from the first end of the launcher 22, and may be plastically deformed. Specifically, the tubular portion 64 is formed in a tubular shape that extends in the axial direction such that the first axial end of the tubular portion 64 is connected to an outer edge of the receiving portion 63 and the second axial end of the tubular portion 64 is connected to an inner edge of the flange portion 62. The tubular portion 64 is plastically deformed by the pressing force received by the receiving portion 63 in the case where the receiving portion 63 is brought into contact with and pressed by the large diameter portion 24a of the rocket part 24. A diameter of the tubular portion 64 is substantially the same as the inner diameter of the launcher 22. A closed space 68 (first gap) is formed, near the rounded portion of the second axial end of the launcher 22, by the flange portion 62 and the tubular portion 64.

The first gasket 54 of the gasket structure 52 is arranged in the space 68. The first gasket 54 has a size such that the first gasket 54 is elastically deformed in a state where it is arranged in the space 68. The first gasket 54 is elastically deformed in a state where it is arranged in the space 68, and thus, the first gasket 54 seals the gap 29 (specifically, a gap between the inner wall surface of the launcher 22 and the gasket holder 58).

Further, the second gasket 56 is arranged in the space 70. The second gasket 56 has a size such that the second gasket 54 is elastically deformed in a state where it is arranged in the space 70. The second gasket 56 is elastically deformed in a state where it is arranged in the space 70, and thus, the second gasket 56 seals the gap 29 (specifically, a gap between the outer wall surface of the rocket part 24 and the gasket holder 58). The second gasket 56 is arranged on the second axial side with respect to the receiving portion 63 of the gasket holder 58.

It is impossible for the first gasket 54 to jump outside from the space 68 because the first gasket 54 is surrounded by the launcher 22, the flange portion 62 of the gasket holder 58, and the tubular portion 64 of the gasket holder 58 in a state where the first gasket 54 is arranged in the space 68. Further, it is impossible for the second gasket 56 to jump outside from the space 70 (especially, including a space on the first axial side, that is, the gap 29) because the second gasket 56 is surrounded not only by the rocket part 24 and the end pad 42 but also by the tubular portion 64 and the receiving portion 63 of the gasket holder 58.

Further, at the first axial end of the rocket part 24, a third gasket 72 is provided. The third gasket 72 is an elastic part made of a resin (O-ring, etc.,) and is formed in a ring shape surrounding a circumference of the large diameter portion 20b of the gas generator 20. The third gasket 72 has an outer diameter that is substantially the same as the inner diameter of the body of the launcher 22, and has an inner diameter that is substantially the same as the outer diameter of the large diameter portion 20b of the gas generator 20. The third gasket 72 fills a gap between the first axial end of the rocket part 24 and an inner surface of the first axial end of the launcher 22 before the activation of the gas pressure actuator 10. The gasket structure 72 is provided to seal a gap between a portion at the first axial end of the launcher 22 and a portion at the first axial end of the rocket part 24 before the activation of the gas pressure actuator 10.

In the followings, a method of assembling a gas pressure actuator 10 according to an embodiment of the present invention will be described.

In an embodiment of the present invention, in assembling the gas pressure actuator 10, the gas generator 20 having a columnar shape is first inserted into an opening at the first axial end of the rocket part 24 in a direction from the first axial end toward the second axial end, i.e., an opposite end, of the rocket part 24. As a result of the above-described first step, the second small diameter portion 20c of the gas generator 20 is fit into the small diameter portion 24b of the rocket part 24, the large diameter portion 20b of the gas generator 20 is fit into the large diameter portion 24a of the rocket part 24, and the entire circumference of the step between the large diameter portion 24a and the small diameter portion 24b of the rocket part 24 is brought into contact with the step between the large diameter portion 20b and the second small diameter portion 20c of the gas generator 20. Thus, the gas generator 20 is supported by the rocket part 24 and positioning of the gas generator 20 and the rocket part 24 is determined. It should be noted that, when the positioning of the gas generator 20 and the rocket part 24 is determined as described above, the opening at the first axial end of the rocket part 24 is blocked by existence of the gas generator 20, and thus, a space 30 is formed in the rocket part 24.

Next, the rocket part 24, which supports the gas generator 20, is arranged to be coaxial with the launcher 22, and the launcher 22 is moved from the first axial end of the rocket part 24 toward the second axial end, i.e., an opposite end, and thus, the rocket part 24 is covered by the launcher 22. As a result of the above-described second step, the rocket part 24 with the gas generator 20 is inserted from the opening 32 of the launcher 22, and the rocket part 24 is placed in the tubular space 26 of the launcher 22. In this case, the rocket part 24 with the gas generator 20 is covered by the launcher 22, and the large diameter portion 24a of the rocket part 24 is fit into the tubular space 26 of the launcher 22. The above-described second step is performed until the gas generator 20 is supported by the first axial end of the launcher 22, that is, until an axial position of the second axial end of the launcher 22 becomes substantially equal to an axial position of the second axial end of the rocket part 24.

Then, at the second axial end of the launcher 22 and the rocket part 24, the first gasket 54, the gasket holder 58, and the second gasket 56 are assembled in this order facing the first axial end of the launcher 22 and the rocket part 24. It should be noted that, after the first gasket 54 is assembled to the gasket holder 58 from the first axial side and the second gasket 56 is assembled to the gasket holder 58 from the second axial side, the gasket holder 58, with which the first and the second gaskets 54, 56 have been assembled, may be assembled to the second axial end of the launcher 22 and the rocket part 24, facing the first axial end of the launcher 22 and the rocket part 24.

Afterwards, the end pad 42 is assembled in such a way that the flange portion 62 of the gasket holder 58 is sandwiched between the end pad 42 and the flange 34 of the launcher 22. Next, the end pad 42, the gasket holder 58, and the flange 34 of the launcher 22 are fastened or fixed together by inserting the rivets 50 into the through holes 48 of the end pad 42, the through holes 66 of the gasket holder 58, and the through holes 36 of the flange 34 of the launcher 22 toward the first axial end of the launcher 22.

It should be noted that the first axial end of the launcher 22 may be crimped inward in a radial direction. In this case, after the crimping, the opening 28 with a desired diameter may be formed, the first small diameter portion 20a of the gas generator 20 may be fit into the opening 28, and the entire circumference of the end surface 20b1 of the large diameter portion 20b of the gas generator 20 may be brought into contact with an inner surface of the first axial end of the launcher 22 (via the third gasket 72). Even with the above arrangement, the gas generator 20 is still supported by the first axial end of the launcher 22, and thus, the gas generator 20 is sandwiched in the axial direction between the rocket part 24 and the launcher 22 at the large diameter portion 20b.

Further, before the gas pressure actuator 10 is activated, positioning of the rocket part 24 is determined by the protrusions 46 of the end pad 42 at the second axial end, and thus, the rocket part 24 is supported by the end pad 42; and, when the gas pressure actuator 10 is activated, the rocket part 24 is pressed toward the second axial end according to high-pressure gas generated at the first axial end by the gas generator 20. The rocket part 24 is retained in the tubular space 26 of the launcher 22 and the positioning of the rocket part 24 is determined with respect to the launcher 22, and thus, a relative positional relationship among the gas generator 20, the launcher 22, and the rocket part 24 is fixed to a desired positional relationship.

Afterwards, in applying the gas pressure actuator 10 to the vehicle safety device 12, the bracket 38 provided on an outer wall surface of the launcher 22 is attached to the body of the vehicle 14 via a bolt that goes through the through hole 40, and thus, the gas pressure actuator 10 is fixed to the body of the vehicle 14. It should be noted that, even in the case where the gas pressure actuator 10 is fixed to the body of the vehicle 14 as described above, the gap between the launcher 22 and the rocket part 24 is still sealed and the positioning of the rocket part 24 with respect to the launcher 22 is still determined before the gas pressure actuator 10 is activated.

In the followings, operations of a gas pressure actuator 10 according to an embodiment of the present invention will be described.

After the gas pressure actuator 10 according to an embodiment of the present invention is assembled as described above and before the gas pressure actuator 10 is activated, the rocket part 24 is placed in the tubular space 26 of the launcher 22. In a state as described above, when a collision between the vehicle 14 and a pedestrian is detected or the collision is expected, the controller determines that it is necessary to activate the gas pressure actuator 10 and sends an activation command to the gas generator 20 via the signal line.

Upon receiving the activation command, the gas generator 20 operates and generates high-pressure gas. The generated high-pressure gas flows into the space 30 in the rocket part 24 adjacent to the gas generator 20. It should be noted that the space 30 is a blocked space for which the gas generator 20 functions as a lid at the first axial end of the rocket part 24, and thus, undesired leakage of the high-pressure gas generated by the gas generator 20 from the space 30 can be prevented.

When the high-pressure gas flows into the space 30 as described above, the large diameter portion 20a of the rocket part 24 slides on the inner wall surface of the launcher 22 fixed to the body of the vehicle 14, and the rocket part 24 is immediately displaced in a direction away from the first end of the launcher 22 with respect to the launcher 22, and protrudes from the second axial end of the launcher 22. The protrusions 46 of the end pad 42 are bent and deformed or fractured by the end surface of the second axial end of the rocket part 24 that has protruded from the second axial end of the launcher 22, and the rocket part 24 goes through the opening 44 of the end pad 42.

When the gas pressure actuator 10 is extended according to the displacement of the rocket part 24 as described above, the vehicle safety device 12 is activated by the gas pressure actuator 10. Specifically, the windshield 18 side of the hood 16 of the vehicle 14 is lifted, and a large space is formed under the hood 16. Therefore, according to the present embodiment, it is possible to reduce an impact applied by the hood 16 to a pedestrian hit by the vehicle 14 and it is also possible to prevent the pedestrian from colliding with the windshield 18.

An outer diameter of the large diameter portion 24a of the rocket part 24 is greater than a diameter of the opening 44 of the end pad 42. As a result, when the rocket part 24 is displaced in a direction away from the first end of the launcher 22 with respect to the launcher 22, the displacement is allowed until the end surface 24a1 of the large diameter portion 24a of the rocket part 24 is brought into contact with the end pad 42 via the second gasket 56. In other words, after the end surface 24a1 is brought into contact with the end pad 42, further displacement of the rocket part 24 is restricted.

Here, in the case where it is assumed that the gas pressure actuator 10 operates in a state without the hood 16 as a load, when high-pressure gas is generated by the gas generator 20, the pressing force that is applied by the rocket part 24 to the end pad 42 via the second gasket 56 according to the high-pressure gas will be much greater than a pressing force that is applied to the end pad 42 in a normal state with the hood 16 as a load. Therefore, it is necessary to design the end pad 42 extremely strong.

With respect to the above, in the present embodiment, in the case where the pressing force that is applied to the rocket part 24 is excessively great without a load, and thus, the gas pressure actuator 10 is extended more than normal amount of extension, it is possible for the end surface 24a1 of the large diameter portion 24a of the rocket part 24 to be brought into contact with the receiving portion 63 of the gasket holder 58 and to press the receiving portion 63 toward the second axial side. When the large diameter portion 24a of the rocket part 24 presses the receiving portion 63 toward the second axial side, the tubular portion 64 of the gasket holder 58 is plastically deformed by the pressing force (as illustrated in FIG. 6).

When the tubular portion 64 of the gasket holder 58 is plastically deformed, the force displacing the rocket part 24 in a direction away from the first end of the launcher 22 is absorbed by the plastic deformation. Therefore, according to the present embodiment, even if the pressing force, which is applied to the rocket part 24 due to the high-pressure gas generated by the gas generator 20, is excessively great without a load for the gas pressure actuator 10, it is still possible to reduce the impact applied to the end pad 42 located at the end of a stroke from the rocket part 24 by the plastic deformation of the tubular portion 64 of the gasket holder 58. Therefore, even when there is no load, it is still possible to prevent from damaging parts located at the end of a stroke, and to prevent the parts from scattering.

Further, in the case where the tubular portion 64 of the gasket holder 58 is plastically deformed, the size of the space 70 is reduced due to the plastic deformation of the tubular portion 64. In this case, the second gasket 56 arranged in the space 70 is further elastically deformed according to the reduction of the space 70. When the gasket 56 is elastically deformed, the force displacing the rocket part 24 in a direction away from the first end of the launcher 22 is absorbed by the elastic force. Therefore, according to the present embodiment, even if the pressing force, which is applied to the rocket part 24 due to the high-pressure gas generated by the gas generator 20, is excessively great without a load for the gas pressure actuator 10, it is still possible to further reduce the impact applied from the rocket part 24 to the end pad 42 not only by the plastic deformation of the tubular portion 64 of the gasket holder 58 but also by the elastic deformation of the second gasket 56.

Therefore, according to the present embodiment, even when the gas pressure actuator 10 is activated without a load, it is still possible to prevent the rocket part 24 from flying out from the tubular space 26 of the launcher 22 and from being separated from the launcher 22.

Further, in the present embodiment, the second gasket 56 is arranged on the second axial side with respect to the receiving portion 63 of the gasket holder 58. The receiving portion 63 is formed in a ring shape which extends inward in a radial direction and whose length in a radial direction is slightly less than a length in a radial direction of the gap 29 between the inner wall surface of the launcher 22 and the outer wall surface of the rocket part 24. As a result, even when, after the gas pressure 10 is activated, the rocket part 24 is retracted due to a reaction force from the hood 16 and a force is applied to the second gasket 56 to displace the second gasket 56 toward the first axial side according to the retraction, it is still possible for the receiving portion 63 of the gasket holder 58 to receive the force.

Therefore, according to the present embodiment, after the gas pressure actuator 10 is activated, when the rocket part 24 is retracted toward the first axial end of the launcher 22, it is possible for the receiving portion 63 of the gasket holder 58 to restrict the second gasket 56 from being displaced toward the first axial side. Therefore, when the rocket part 24 is retracted as described above, it is possible to prevent the second gasket 56 from being dragged toward the first axial side, to prevent the second gasket 56 from being displaced in the gap 29 toward the first axial end of the launcher 22, and to prevent the second gasket 56 from being engaged at a position deep inside the gap 29.

Further, in the present embodiment, the first and the second gaskets 54, 56 used for sealing the gap 29 are O-rings that each have circular sections. Here, it is not necessary to cause the first and the second gaskets 54, 56, which are arranged at the second axial end of the launcher 22, to have special shapes with flanges corresponding to the launcher 22 and the end pad 42. Therefore, according to the present embodiment, it is possible to provide the sealing of the gap 29 by using inexpensive parts as the first and the second gaskets 54, 56.

It should be noted that, in the present embodiment described above, the first and the second gaskets 54, 56 may correspond to "gasket", the flange 34 may correspond to "assembling and fixing flange", the flange portion 62 may correspond to "holder flange portion", the first gasket 54 may correspond to "first gasket", and the second gasket 56 may correspond to "second gasket".

A gas pressure actuator according to an embodiment of the present invention has been described above. The present invention is not limited to the above embodiments. Various modifications and variations can be made within the scope of the present invention. For example, in the present embodiment described above, the first and the second gaskets 54, 56 are O-rings having circular sections. However, the first and the second gaskets 54, 56 are not limited to the above. The first and the second gaskets 54, 56 may have shapes corresponding to the shapes of the spaces 68, 70.

The present application is based on and claims the benefit of priority of Japanese Priority Application No. 2015-039354 filed on Feb. 27, 2015, the entire contents of which are hereby incorporated by reference.

Description of the Reference Numerals 10 gas pressure actuator
20 gas generator
22 launcher
24 rocket part
24a large diameter portion
29 gap
34 flange
42 end pad
46 protrusion
52 gasket structure
54 first gasket
56 second gasket
58 gasket holder
62 flange portion
63 receiving portion
64 tubular portion
68, 70 space

What is claimed is:

1. A gas pressure actuator comprising:
a launcher that has a tubular shape;
a gas generator that is disposed at a first axial end of the launcher and generates high-pressure gas when the gas pressure actuator is activated;
a rocket part that has a first portion disposed at a location corresponding to the first axial end of the launcher and a second portion which has a diameter less than that of the first portion and which ranges from the first portion toward a second axial end that is opposite to the first axial end of the launcher, the rocket part being placed inside the launcher;
an end pad that is disposed at the second axial end of the launcher and includes a position determination part which determines positioning of the rocket part with respect to the launcher and which restricts the rocket part from being displaced in a direction away from the first axial end of the launcher;
a gasket that is disposed at the second axial end of the launcher and seals a gap between the launcher and the rocket part; and
a gasket holder that supports the gasket and is configured to be plastically deformed by being pressed by the first portion of the rocket part when the rocket part protrudes from the launcher in response to an activation of the gas pressure actuator.

2. The gas pressure actuator according to claim 1, wherein the gasket holder is formed in a shape that restricts the gasket from being displaced toward the first axial end of the launcher when the rocket part is retracted after the activation of the gas pressure actuator.

3. The gas pressure actuator according to claim 1, wherein the launcher includes an assembling and fixing flange disposed at the second axial end, and
the gasket holder includes a holder flange portion that is sandwiched between the assembling and fixing flange and the end pad, a receiving portion that is brought into contact with the first portion when the rocket part protrudes, and that receives a pressing force in a direction away from the first axial end of the launcher, and a tubular portion that is plastically deformed by the pressing force the receiving portion receives when the rocket part protrudes.

4. The gas pressure actuator according to claim 3, wherein the gasket includes a first gasket that seals a first gap formed between the launcher and the gasket holder and a second gasket that seals a second gap formed between the rocket part and the gasket holder, and
the receiving portion is formed in a shape that restricts the second gasket from being displaced toward the first axial end of the launcher when the rocket part is retracted after the activation of the gas pressure actuator.

5. The gas pressure actuator according to claim 4, wherein the first gasket and the second gasket are O-rings having circular sections.

6. The gas pressure actuator according to claim 1, wherein the gasket includes a first gasket that seals a first gap formed between the launcher and the gasket holder and a second gasket that seals a second gap formed between the rocket part and the gasket holder.

7. The gas pressure actuator according to claim 6, wherein the first gasket and the second gasket are O-rings having circular sections.

\* \* \* \* \*